(12) United States Patent
Laundre

(10) Patent No.: US 10,582,817 B2
(45) Date of Patent: *Mar. 10, 2020

(54) TOILET SEAT LIGHTING APPARATUSES

(71) Applicant: Kohler Co., Kohler, WI (US)

(72) Inventor: Jeffrey T. Laundre, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,820

(22) Filed: Jan. 21, 2019

(65) Prior Publication Data

US 2019/0150681 A1 May 23, 2019

Related U.S. Application Data

(63) Continuation of application No. 15/425,783, filed on Feb. 6, 2017, now Pat. No. 10,194,777.

(51) Int. Cl.
| | |
|---|---|
| *A47K 13/12* | (2006.01) |
| *A47K 13/24* | (2006.01) |
| *F21V 33/00* | (2006.01) |
| *F21V 5/04* | (2006.01) |
| *F21V 7/04* | (2006.01) |
| *H05B 37/02* | (2006.01) |
| *F21V 7/00* | (2006.01) |

(52) U.S. Cl.
CPC ............. *A47K 13/24* (2013.01); *A47K 13/12* (2013.01); *F21V 5/04* (2013.01); *F21V 7/0091* (2013.01); *F21V 7/04* (2013.01); *F21V 33/004* (2013.01); *H05B 37/0227* (2013.01)

(58) Field of Classification Search
CPC ................................ A47K 13/212; F21V 5/04

USPC .................................................. 4/234–240
See application file for complete search history.

(56) References Cited

U.S. PATENT DOCUMENTS

| | | | |
|---|---|---|---|
| 1,880,892 A | 10/1932 | Dodge | |
| 2,206,094 A | 7/1940 | Hobbs | |

(Continued)

FOREIGN PATENT DOCUMENTS

| | | |
|---|---|---|
| CN | 201175307 | 1/2009 |
| CN | 201234379 | 5/2009 |

(Continued)

OTHER PUBLICATIONS

Bemis; Affinity with ILumalight Residential Plastic Toilet Seat; 200E3NL; 1 pg.

(Continued)

*Primary Examiner* — Lauren A Crane
(74) *Attorney, Agent, or Firm* — Foley & Lardner LLP

(57) ABSTRACT

A toilet assembly that includes a toilet base including a bowl, a hinge assembly, and a toilet seat. The hinge assembly includes a housing configured to be secured to the toilet base; a lens comprising a base, which is enclosed within the housing, and a curved portion, which extends forward from the base beyond the housing to direct light from the light source downwardly toward the bowl, wherein the curved portion includes an upper arcuate surface and a lower arcuate surface; and a light source enclosed within the housing and configured to emit light toward an inlet of the base of the lens. The toilet seat is pivotally coupled to the hinge assembly, such that the toilet seat rotates relative to the housing and the lens.

17 Claims, 13 Drawing Sheets

(56) References Cited

U.S. PATENT DOCUMENTS

| | | |
|---|---|---|
| 2,336,677 A | 12/1943 | Frey |
| 2,460,543 A | 2/1949 | Spierer |
| 2,721,531 A | 10/1955 | Findley, Jr. |
| 2,766,716 A | 10/1956 | Mackey |
| 2,947,850 A | 8/1960 | Reilly |
| 3,045,096 A | 7/1962 | Clayton |
| 3,982,288 A | 9/1976 | Borne |
| 4,413,364 A | 11/1983 | Bittaker |
| 4,491,991 A | 1/1985 | Herbruck |
| 4,521,833 A | 6/1985 | Wolter |
| 4,623,955 A | 11/1986 | Santini |
| 4,636,474 A | 1/1987 | Ogura |
| 4,731,712 A | 3/1988 | Amthor |
| 4,733,419 A | 3/1988 | Nee |
| 4,736,471 A | 4/1988 | Johnson |
| 4,849,742 A | 7/1989 | Warrington |
| 4,860,178 A | 8/1989 | Picon |
| 4,883,749 A | 11/1989 | Roberts |
| 5,003,648 A | 4/1991 | Anderson |
| 5,036,443 A | 7/1991 | Humble |
| 5,123,130 A | 6/1992 | Sanders |
| 5,136,476 A | 8/1992 | Horn |
| 5,150,962 A | 9/1992 | Rauschenberger |
| 5,263,209 A | 11/1993 | Pattee |
| 5,276,595 A | 1/1994 | Patrie |
| 5,437,066 A | 8/1995 | Mills |
| 5,664,867 A | 9/1997 | Martin |
| 5,822,806 A | 10/1998 | Kizhnerman |
| 5,896,600 A | 4/1999 | Mills |
| 5,926,099 A | 7/1999 | Unum |
| 5,926,867 A | 7/1999 | Buchanan |
| 6,003,160 A | 12/1999 | Seidle |
| 6,203,164 B1 | 3/2001 | Tufekci |
| 6,279,180 B1 | 8/2001 | Bell |
| 6,698,036 B2 | 3/2004 | Armbruster |
| 6,805,458 B2 | 10/2004 | Schindler |
| 7,036,158 B2 * | 5/2006 | Bradford ................. A47K 13/24 4/240 |
| 7,722,237 B2 | 5/2010 | Watson |
| 8,398,257 B1 | 3/2013 | Paulus |
| 9,041,298 B2 | 5/2015 | Andy |
| 9,380,918 B2 * | 7/2016 | Murphy ................. A47K 13/24 |
| 2004/0184273 A1 | 9/2004 | Reynolds et al. |
| 2008/0060119 A1 | 3/2008 | Pinizzotto |
| 2011/0191950 A1 | 8/2011 | Liu |
| 2014/0250578 A1 | 9/2014 | Murphy |
| 2016/0088984 A1 | 3/2016 | Chen |

FOREIGN PATENT DOCUMENTS

| | | |
|---|---|---|
| EP | 0766-037 | 4/1997 |
| JP | 2001-266627 | 9/2001 |
| JP | 2007-117237 | 5/2007 |
| JP | 2007-197899 | 8/2007 |
| JP | 2010-101034 | 5/2010 |

OTHER PUBLICATIONS

Bemis; Affinity with ILumalight Residential Plastic Toilet Seat; 300E3NL; 1 pg.
Bemis; Affinity with ILumalight Residential Plastic Toilet Seat; 380E3NL; 1 pg.
Bemis; Affinity with ILumalight Residential Plastic Toilet Seat; 1200E3NL; 1 pg.
Affinity; iLumalight; Affinity and iLumaLight Toilet Seats; 9 pgs.
Potty Seat Option; 1 pg.
Sanborne; Round Front Slow Close; Quick-Release Nightlight Seat; Model #803902-N-WH; 1 pg.
Sanborne; Elongated Slow Close; Quick-Release Nightlight Seat; Model #813902-N-WH; 1 pg.
Sanborne; Round Front Slow Close; Quick-Release Nightlight Seat; Model #823902-N-WH; 1 pg.
Sanborne; Elongated Slow Close; Quick-Release Nightlight Seat; Model #833902-N-WH; 2 pg.
Toilets: Elongated, Round and More: Delta Faucet; 4 pgs.
Toilet Seat Night Light: LED Lighted Toilet Seats; Delta Faucet; 5 pgs.
Models 803902-N-; 813902-N; 823902-N; 833902-N.
Delta; Nightlight Toilet Seat; Sanborne Collection; 803902 1 pg.
Delta; Nightlight Toilet Seat; Sanborne Collection; 813902; 1 pg.
Delta; Nightlight Toilet Seat; Sanborne Collection; 823902; 1 pg.
Delta; Nightlight Toilet Seat; Sanborne Collection; 833902; 1 pg.
Night-Light Potty Training Toilet Seat; 7 pgs.
Bemis; iLumaLight; Owners Manual; 10 pgs.
Bemis; Packaging for liLumaLight_8_Hour_Night_Light.
Delta;Packaging for Sanborne Nightlight; Elongated Toilet Seat.
GlowBowl; Motion Activated Toilet Nightlight; 7 pgs.
LED; Toilet Night Lights; Motion Activated Toilet Nightlight; Glowbowl; 4 pgs.
Amazon; Illumibowl Toilet Night Light; 11 pgs.
Illumibowl; Motion Activated Toilet Night Light; 4 pgs.
Illumibowl; Motion Activated Toilet Night Light; Fits Any Toilet; 3 pgs.
Illumibowl; Motion Activated Toilet Night Light; Instructions; 3 pgs.
Night Glow Seats; 8 pgs.
Night Glow; Generic Assembly Instructions for Seats with Top Mounted Nuts and Bolts; 1 pg.
Night Glow; Products; 2 pgs.
Sharper Image; Sound Activated Nightlight Toilet Seat; 2 pgs.
GlowBowl; Motion Activated Toilet Nightlight; 4 pgs.
Illumibowl; Motion Activated Toilet Night Light; Clip on Motion; 3 pgs.
Sharper Image; Sound Activated Nightlight Toilet Seat; Features; 2 pgs.

* cited by examiner

TOILET SEAT LIGHTING APPARATUSES

CROSS-REFERENCE TO RELATED APPLICATIONS

This application is a Continuation of U.S. patent application Ser. No. 15/425,783, which was filed on Feb. 6, 2017, and is incorporated by reference herein in its entirety.

BACKGROUND

Certain mechanisms exist for lighting fixtures such as a toilet, but have limitations such as poor illumination given the configuration of the mechanisms. These limitations may make it difficult for a person to see certain features of the fixture at night. It would be advantageous to have lighting mechanisms that provide better illumination, lighting mechanisms with better lighting efficiency, or lighting mechanisms that improve the performance or life of power sources that may power the lighting mechanisms given the better illumination.

SUMMARY

One example embodiment relates to a toilet assembly. The toilet assembly includes a toilet base including a bowl, and a tank coupled to the toilet base. The toilet assembly further includes a seat assembly connected to the toilet base. The seat assembly includes a hinge assembly including a hinge housing and a lighting mechanism. The lighting mechanism is at least partially disposed within the hinge housing. The lighting mechanism includes a light source and a lens. The lens includes a curved portion configured to direct light from the light source downwardly toward the bowl of the toilet. The seat assembly further includes a ring pivotally connected to the hinge assembly.

Another example embodiment relates to a seat assembly. The seat assembly includes a hinge assembly including a hinge housing and a lighting mechanism. The lighting mechanism is at least partially disposed within the hinge housing. The lighting mechanism includes a light source and a lens. The lens includes a curved portion configured to direct light from the light source downwardly toward a bowl of a toilet. The seat assembly further includes a ring pivotally connected to the hinge assembly.

Another example embodiment relates to a hinge assembly for a toilet seat assembly. The hinge assembly includes a hinge housing and a lighting mechanism. The lighting mechanism is at least partially disposed within the hinge housing. The lighting mechanism includes a light source and a lens. The lens includes a curved portion configured to direct light from the light source downwardly toward a bowl of a toilet.

At least one embodiment relates to a toilet assembly that includes a toilet base including a bowl, a hinge assembly, and a toilet seat. The hinge assembly includes a housing configured to be secured to the toilet base; a lens comprising a base, which is enclosed within the housing, and a curved portion, which extends forward from the base beyond the housing to direct light from the light source downwardly toward the bowl, wherein the curved portion includes an upper arcuate surface and a lower arcuate surface; and a light source enclosed within the housing and configured to emit light toward an inlet of the base of the lens. The toilet seat is pivotally coupled to the hinge assembly, such that the toilet seat rotates relative to the housing and the lens.

At least one embodiment relates to a toilet seat assembly that includes a base, a first light source, a second light source, a housing, and a toilet seat assembly. The base includes a bottom wall configured to mount to a toilet base. The first lens extends away from a first end of the bottom wall, and the first lens has an inlet and a curved portion extending away from the inlet and beyond the first end of the bottom wall. The second lens extends away from a second end of the bottom wall, which is opposite the first end, and the second lens has an inlet that opposes the inlet of the first lens. The first light source is coupled to the base and is configured to emit light directly into the inlet of the first lens, wherein the light from the first light source is redirected from a first direction to a second direction by the curved portion. The second light source is coupled to the base and is configured to emit light directly into the inlet of the second lens. The housing is coupled to the base and encloses the first and second light sources between the housing and the base. The toilet seat assembly is pivotally coupled to the housing.

DETAILED DESCRIPTION

Various embodiments disclosed herein relate to fixtures such as toilets that include a lighting mechanism for illuminating portions of the fixture to facilitate use of the fixture by users. For example, a lighting mechanism may be integrated into a toilet seat hinge component such that light is transmitted outward from the hinge component in one or more directions (e.g., toward the toilet bowl, toward the toilet tank, etc.). Such lighting may be useful in low light conditions to provide a "guide light" to direct a user toward the toilet or a "task light" for use of the toilet. Certain embodiments may provide better illumination than existing lighting mechanisms, better lighting efficiency, or may improve the performance or life of power sources that may power the lighting mechanisms given the better illumination.

In certain embodiments, hinge assemblies disclosed herein may provide a stable and securely mounted lighting mechanism having a relatively easy installation. For example, the lighting mechanism may be at least partially contained within the hinge of the toilet seat assembly by means of protrusions, etc., ensuring a positive connection between components. Furthermore, in certain embodiments, by acting as a "guide light" or a "task light," particularly in low light conditions, a user may be able to easily locate the toilet, easily know whether the seat lid or ring are in an open (e.g., up) position, or have a clear indication of an allowable area for use of the toilet.

Figure 1:
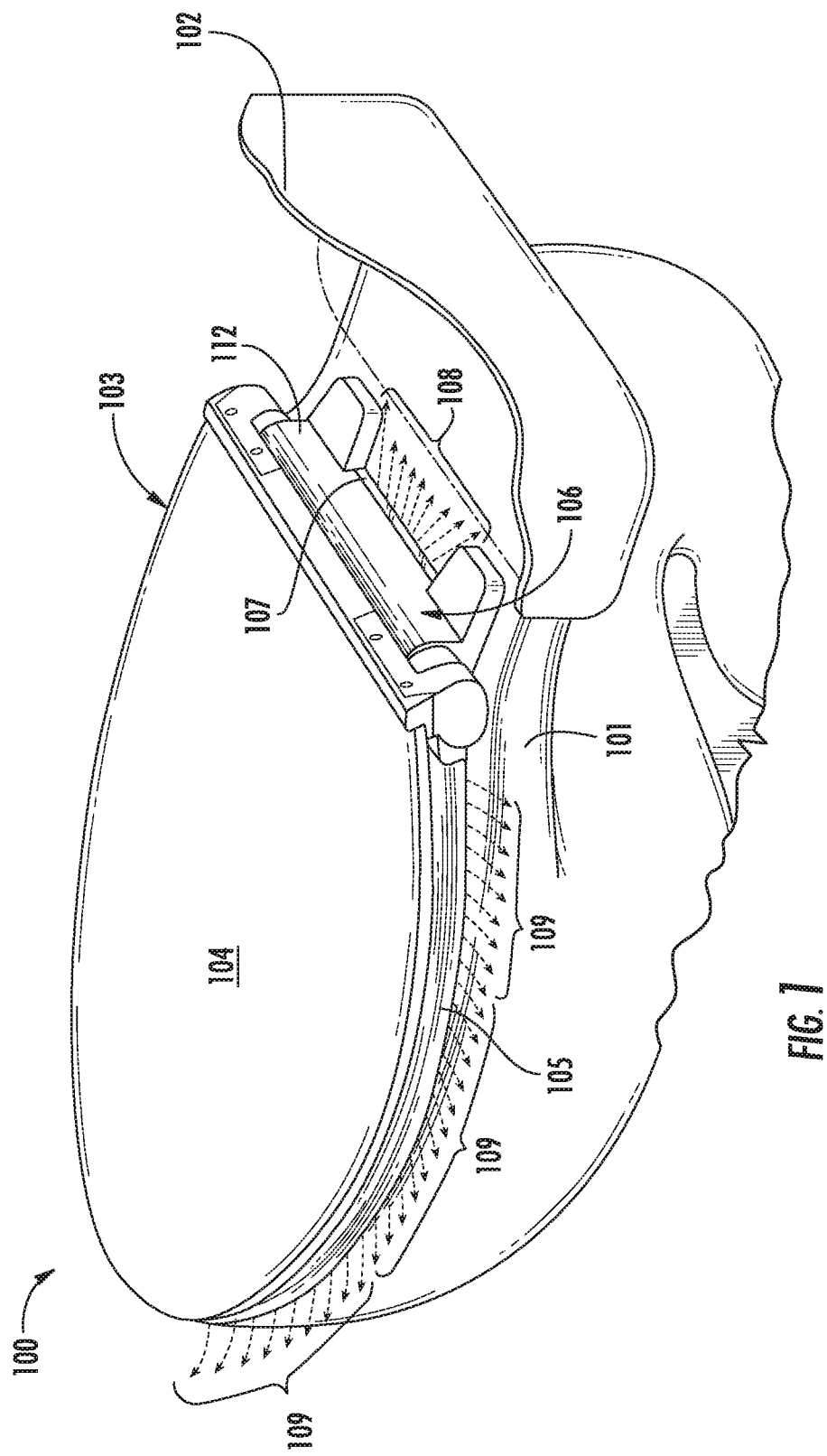
FIG. 1 is a view of a toilet with the lid and ring of a seat assembly in a closed position according to an example embodiment.
Figure 2:
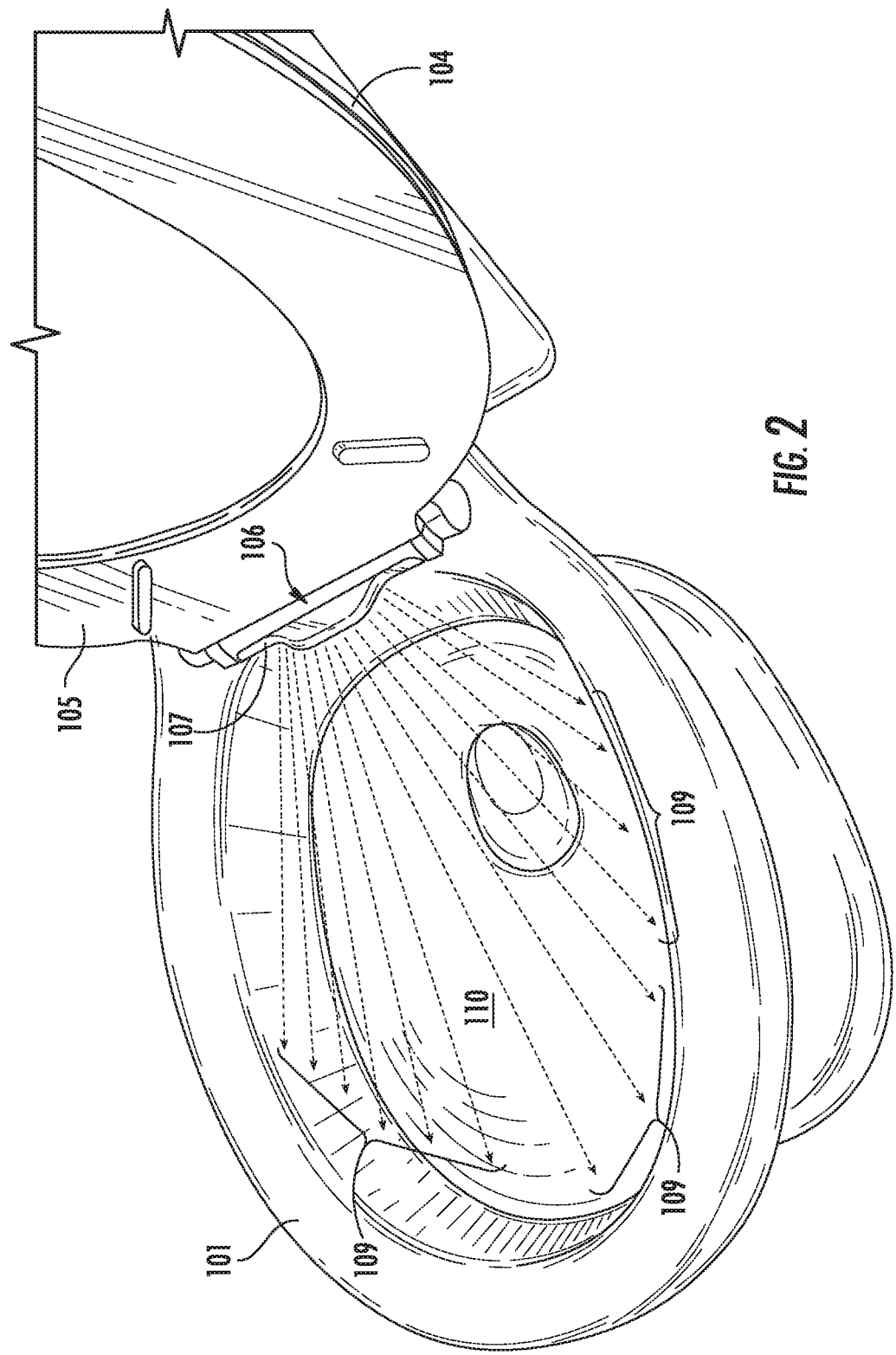
FIG. 2 is a view of a toilet with the lid and ring of a seat assembly in an opened position according to an example embodiment.

Referring now to FIG. 1 and FIG. 2, a toilet 100 is shown according to an example embodiment. Toilet 100 includes a base 101 including a bowl 110 (shown in FIG. 2), a tank 102 (shown in partial cut-away) coupled to base 101, and a seat assembly 103. Seat assembly 103 includes a lid 104, a ring 105, and a hinge assembly 106. Hinge assembly 106 includes a housing 112. Hinge assembly 106 connects seat assembly 103 to base 101 such that lid 104 and ring 105 are pivotable between a closed position (as shown in FIG. 1) and an open position (as shown in FIG. 2). Lid 104 and ring 105 are independently pivotable.

Figure 3:
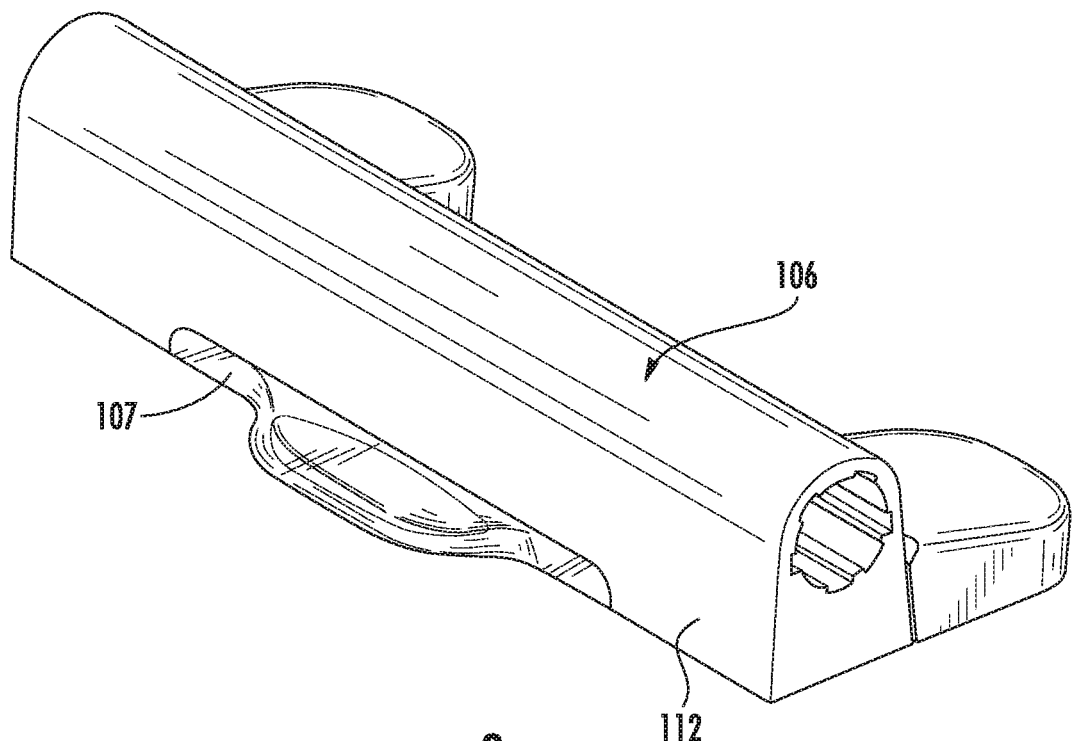
FIG. 3 is a view of a hinge assembly that may be used with the toilet of FIG. 1 or FIG. 2 according to an example embodiment.

Hinge assembly 106 includes a lighting mechanism 107. Lighting mechanism 107 is at least partially encapsulated in, partially enclosed in, or otherwise partially disposed within housing 112 of hinge assembly 106. In certain embodiments, lighting mechanism 107 is configured to direct light 108 toward tank 102 and, in certain embodiments, light 108 may be reflected off of tank 102. Light 108 may act, among other things, as a "guide" light to the toilet such that a user may be able to locate the toilet in a dark room. In certain embodiments, lighting mechanism 107 may be configured to direct light 109 into an interior of the bowl 110 (as shown in FIG. 2). In certain embodiments, light 109 may be reflected off of the interior of the bowl 110. Light 109 that is directed into bowl 110 may act, among other things, as a "task" light such that the bowl 110 is illuminated for enhanced user aiming in a dark room. In certain embodiments, when lid 104 and ring 105 are in the closed position, light 109 may be directed away from the toilet through gaps between base 101, ring 105, and lid 104 (as shown in FIG. 1). Referring now to FIG. 3, a magnified view of hinge assembly 106, including hinge housing 112 and lighting mechanism 107, is shown, for use with the toilet 100 of FIGS. 1 and 2.

Figure 4:
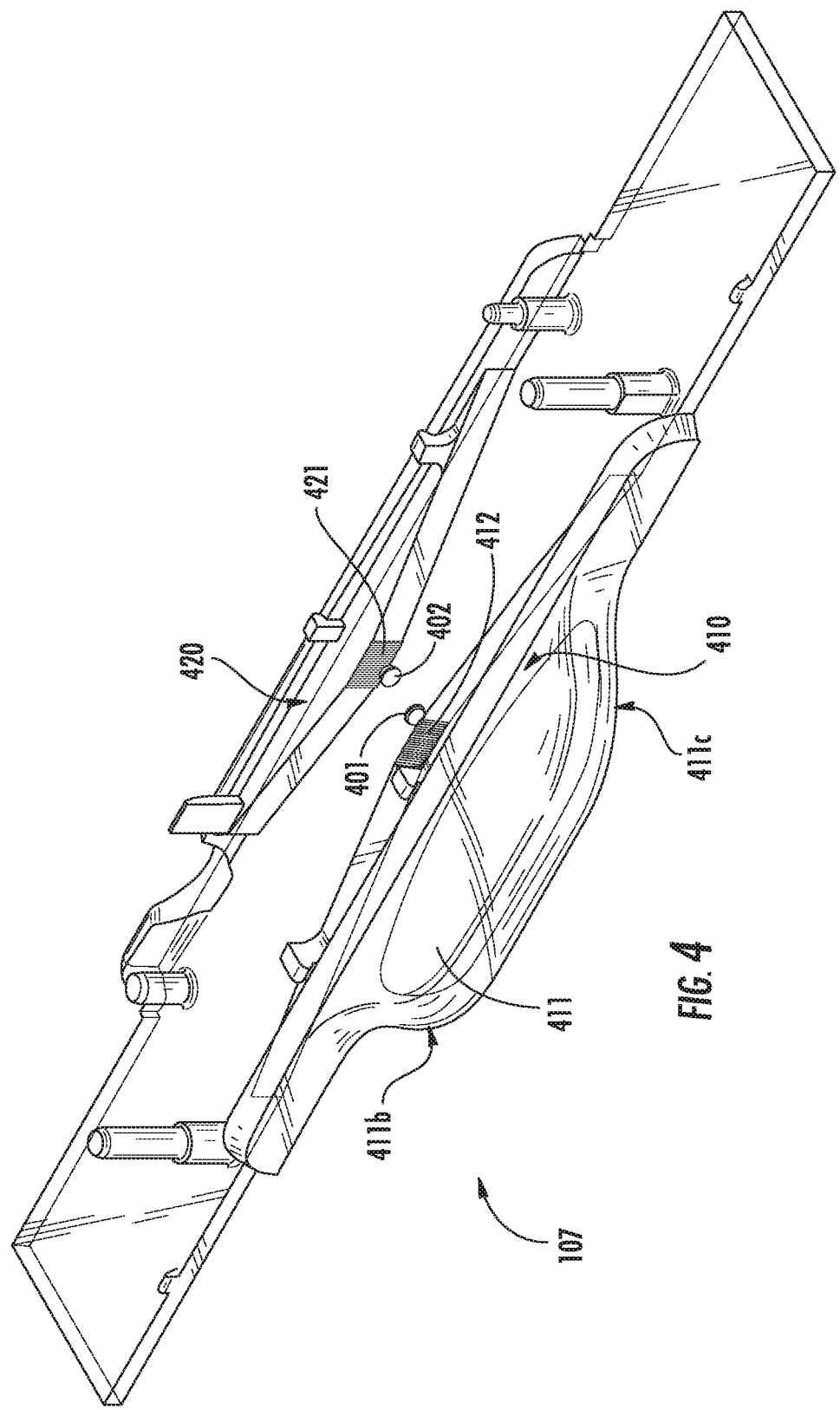
FIG. 4 is a view of a lighting mechanism that may be used with the hinge assembly of FIG. 3 according to an example embodiment.
Figure 5:
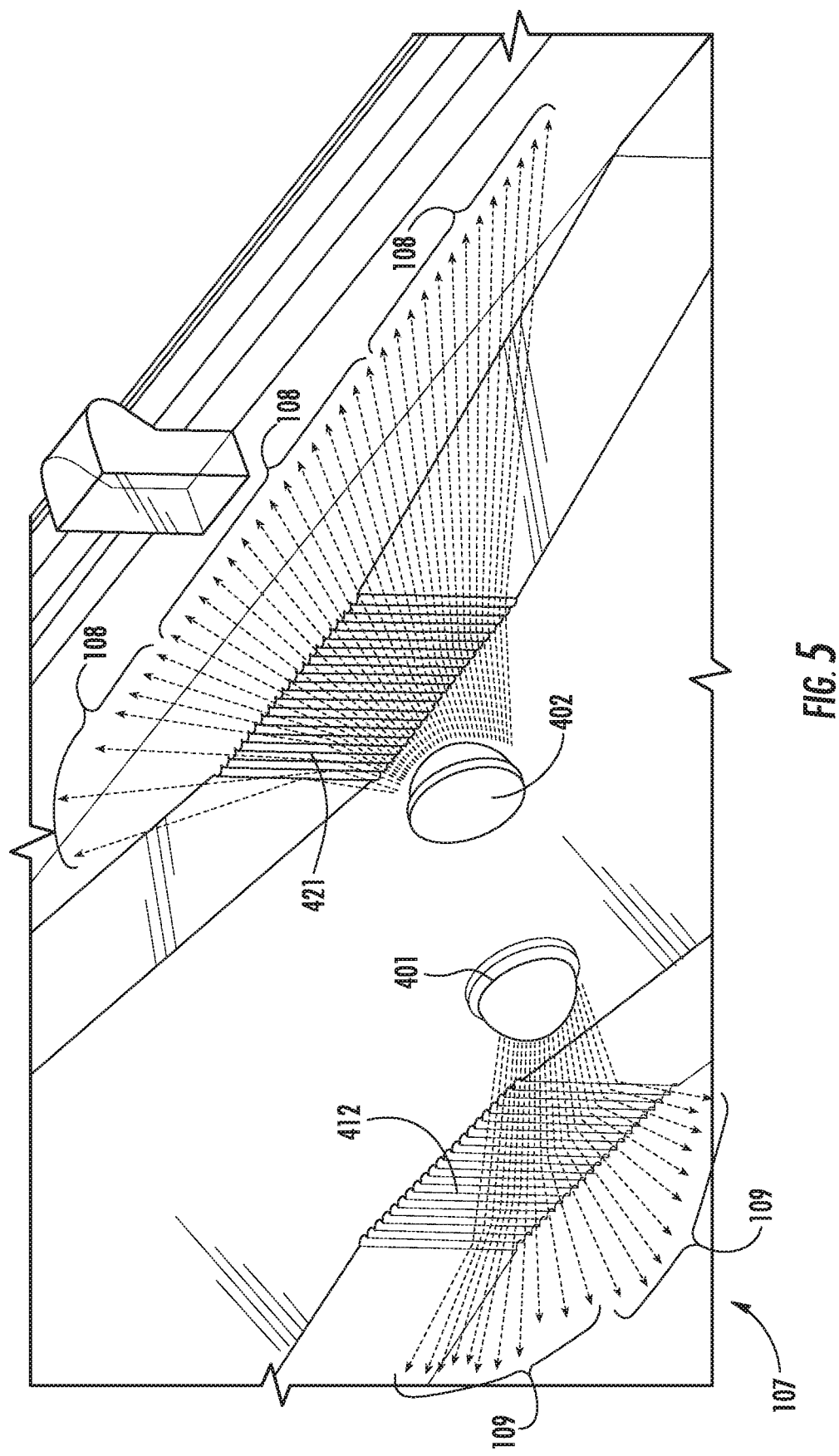
FIG. 5 is a zoomed-in view of the lighting mechanism of FIG. 4 or FIG. 10 according to an example embodiment.
Figure 6:
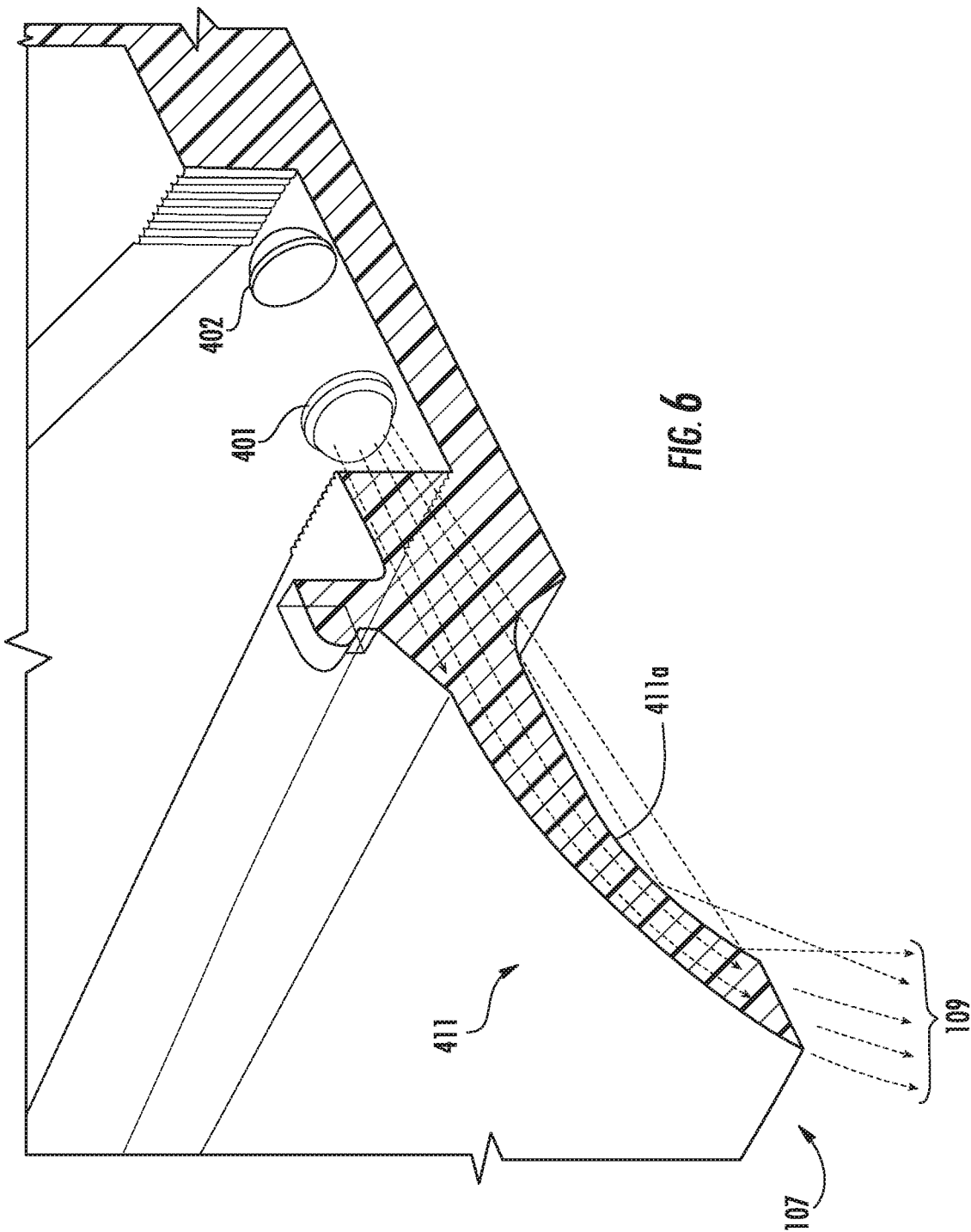
FIG. 6 shows a cross-section of the lighting mechanism of FIG. 4 or FIG. 10 according to an example embodiment.

Referring to FIG. 4, FIG. 5 and FIG. 6, additional details of lighting mechanism 107 are shown according to example embodiments. In certain embodiments, lighting mechanism 107 includes a light source 401 (e.g., an LED or any other type of light source). In certain embodiments, lighting mechanism 107 may also include a lens 410. Lens 410 may include, in certain embodiments, a curved portion 411 configured to "bend" or otherwise direct light 109 from light source 401 downwardly toward a toilet bowl, such as toilet bowl 110 of FIG. 2 (light 109 is not shown in FIG. 4 given that light source 401 is shown in an off state in FIG. 4; light 109 is shown in FIG. 5 and FIG. 6 where light source 401 is shown in an on state, as well as, for example, in FIG. 2). In certain embodiments, curved portion 411 may at least partially extend outside of hinge housing 112, as can be appreciated in FIG. 3 and FIG. 2. In certain embodiments, curved portion 411 may at least partially extend into an area above the opening of a toilet bowl, such as the area above the opening of toilet bowl 110, as can be appreciated in FIG. 2. In certain embodiments, lens 410 may include a rippled surface 412 at a location approximately in front of light source 401, configured to disperse light 109 from light source 401. In certain embodiments, light source 401 may point in a direction approximately perpendicular to the rippled surface 412.

In certain embodiments, as shown in FIG. 4, curved portion 411 may include curved side surfaces 411b and 411c. Each of the curved side surfaces 411b and 411c may generally have a profile that slants rearwardly with rounded corners, as seen from a top view, in the manner of an "s-shape" or the like, such that the side surface curves in one direction and also curves in an opposite direction, tapering back into a portion of the body of lens 410 that may be approximately flush with hinge housing 112. In certain embodiments, such side surfaces 411b and 411c may be intended to direct light 109 at least to lateral sides of bowl 110.

In certain embodiments, lighting mechanism 107 may include a light source 402, configured to emit light 108 at a toilet tank, such as toilet tank 102 shown in FIG. 1 (light 108 is not shown in FIG. 4 given that light source 402 is shown in an off state in FIG. 4; light 108 is shown in FIG. 5 where light source 402 is shown in an on state, as well as, for example, in FIG. 1). In certain embodiments, lighting mechanism 107 may also include a lens 420. Lens 420 may include in certain embodiments a rippled surface 421 at a location approximately in front of the light source 402, configured to disperse light 108 from the light source 402. In certain embodiments, light source 402 may point in a direction approximately perpendicular to the rippled surface 421.

In certain embodiments, the inward offset location of the rippled surface 412 in relation to the perimeter of lighting mechanism 107 may be different than as shown. Different distances between the rippled surface 412 and the perimeter of lighting mechanism 107 may alter the width of the projected light 109 through lens 410. In a similar fashion, in certain embodiments, the inward offset location of the rippled surface 421 in relation to the perimeter of lighting mechanism 107 may be different than as shown. Different distances between the rippled surface 421 and the perimeter of lighting mechanism 107 may alter the width of the projected light 108 through lens 420. In certain embodiments, the flat surfaces shown in FIG. 4 that extend from the rippled surface 412, or that extend from rippled surface 421, may be shaped differently than as shown. For example, the surfaces may be altered, bent, curved or shaped in other ways, further affecting the dispersion of light 109 or light 108.

Light sources 401 and 402 may be powered by any power source, such as, for example, one or more batteries, current from an electrical outlet, or any other power source. In certain embodiments where light sources 401 or 402 are powered by one or more batteries, the one or more batteries may be placed within hinge assembly 106, including in some embodiments within hinge housing 112. In certain embodiments, the light sources 401 and 402 may be programmed to run at the same or different times, or at the same or different intensities to cater to a desired performance or efficiency. In certain embodiments, lighting mechanism 107 may include sensors that may detect if lid 104 is up or down, or sensors that may detect other conditions. Further, in certain embodiments, lighting mechanism 107 may include programming, smart controls, or Bluetooth to provide feedback and dynamically alter the performance or intensity of light sources 401 or 402 depending on inputs from sensors. For example, the light sources may be automatically turned on or off, or the intensity may be automatically lowered or increased depending on whether lid 104 is up or down. In other embodiments, the light sources may be automatically turned on, off, or adjusted depending on other sensor inputs. For example, the sensors may be motion sensors or proximity sensors operably coupled to the light source(s). According to one embodiment, the sensors may provide a signal to increase the intensity of the illumination of the light source as a person approaches the toilet and to decrease the intensity of the illumination as a person leaves the area. By further way of example, the sensors may also be photosensitive and enable the light source to illuminate only below a predetermined background light threshold. According to other embodiments, the light source may have different color capabilities (e.g. multi-color LEDs), in order to impart an enhanced visual or aesthetic appearance to the bathroom décor. Any one or more of these sensors or features may be selectively programmed or modified by a user (e.g. through Bluetooth communication via a smartphone app to a control device or interface associated with the light source, etc.). All such functionalities and capabilities are intended to be within the scope of this disclosure.

In certain embodiments, lens 410 or lens 420 may be made of a transparent or a semi-transparent material, such as, for example, acrylic, poly carbonate, glass, or any other transparent or semi-transparent materials. In certain embodiments, lens 410 or lens 420 may be made of materials that are not transparent or semi-transparent. In certain embodiments, lens 410 or lens 420 may be made of a combination of materials, such as transparent, semi-transparent or non-transparent materials. In certain embodiments, lens 410 or lens 420 may be made by the same material and may form part of a unitary body. In certain embodiments, lens 410 or lens 420 may be disconnected or connected to each other via additional components.

Referring further to FIG. 5, additional details of lighting mechanism 107 are shown according to example embodiments, including additional details of rippled surface 412 and rippled surface 421 according to example embodiments. In certain embodiments, rippled surface 412 may be configured to disperse light 109 from light source 401, and rippled surface 421 may be configured to disperse light 108 from light source 402. An example embodiment is illustrated in FIG. 5. In certain embodiments, rippled surface 412 or rippled surface 421 may include one or more arched surfaces (shown in FIG. 5 as a series of arches arranged in a parallel pattern). In certain embodiments, rippled surface 412 or rippled surface 421 may include one or more angled surfaces forming a "jagged" surface. In certain embodiments, rippled surface 412 or rippled surface 421 may include a combination of these or other shapes intended to disperse light, such as one or more curbed surfaces and one or more angled surfaces.

Referring further to FIG. 6, a cross-section showing additional details of lighting mechanism 107 is shown according to example embodiments, including additional details of curved portion 411 according to example embodiments. In certain embodiments, curved portion 411 may be configured to "bend" or otherwise direct light 109 from light source 401 downwardly toward a toilet bowl, such as toilet bowl 110 of FIG. 2, by acting as a light guide. As can be seen in FIG. 6, curved portion 411 may be configured to act as a light guide by allowing light 109 to travel through curved portion 411, thereby directing light 109 from light source 401 toward the toilet bowl. As can be seen in FIG. 6, in certain embodiments, curved portion 411 may also or alternatively be configured to "bend" or otherwise direct light 109 from light source 401 downwardly toward the toilet bowl, by including a surface 411a configured to allow light 109 from light source 401 to "bounce" or reflect toward the toilet bowl. While FIG. 6 depicts light 109 bouncing from a lower surface 411a of curved portion 411, in certain embodiments, light 109 may "bounce" or reflect from any surface of curved portion 411.

Figure 8:
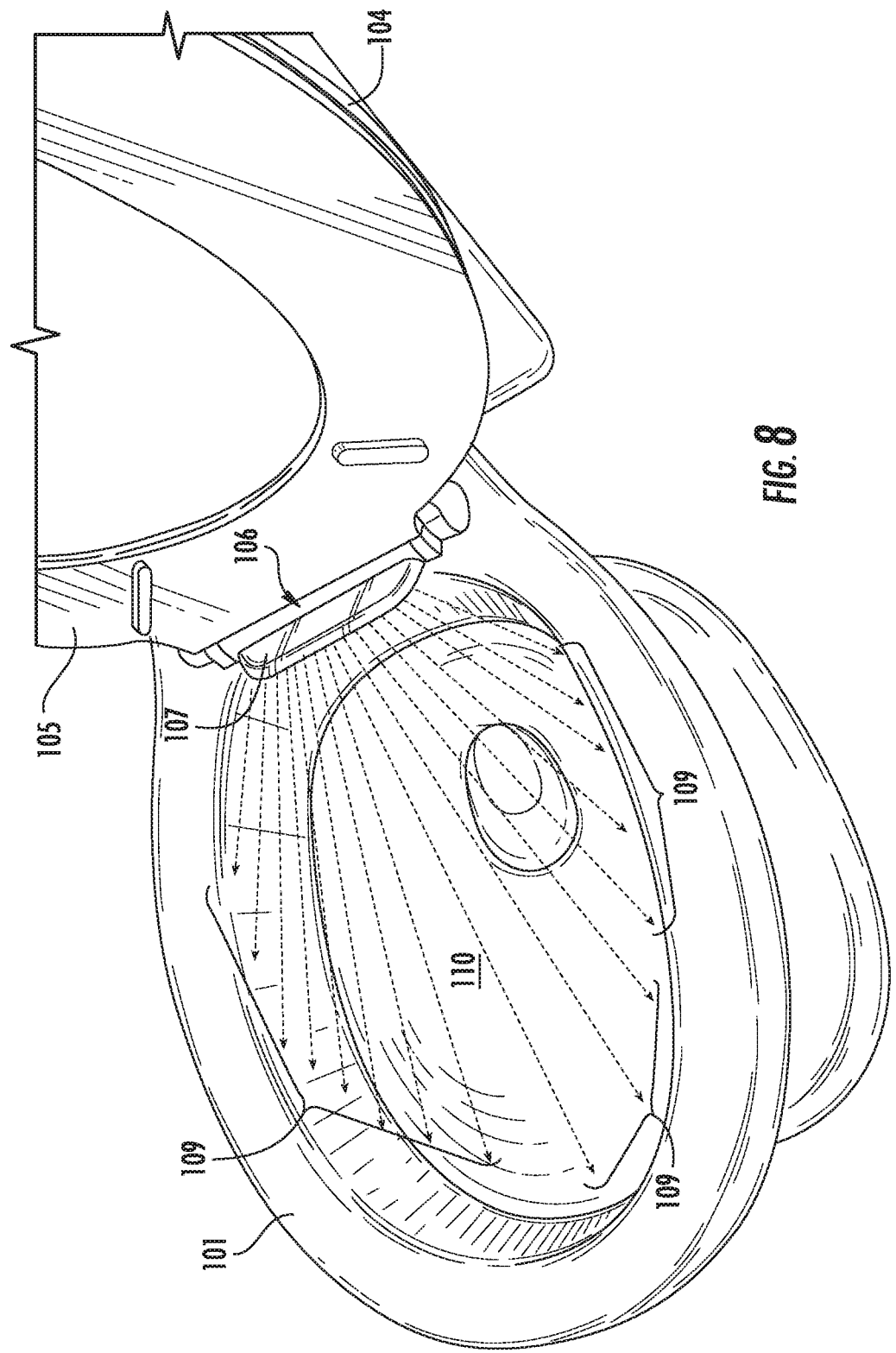
FIG. 8 is a view of a toilet with the lid and ring of a seat assembly in an opened position according to an example embodiment.
Figure 9:
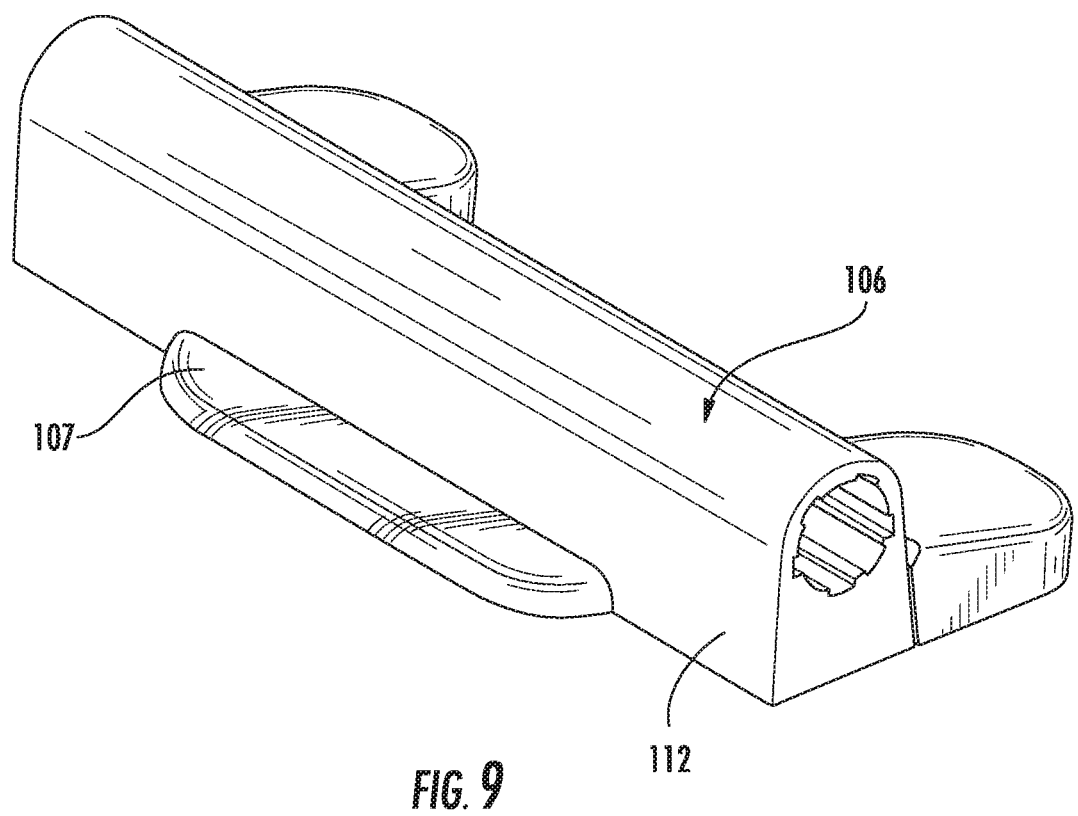
FIG. 9 is a view of a hinge assembly that may be used with the toilet of FIG. 1 or FIG. 8 according to an example embodiment.
Figure 10:
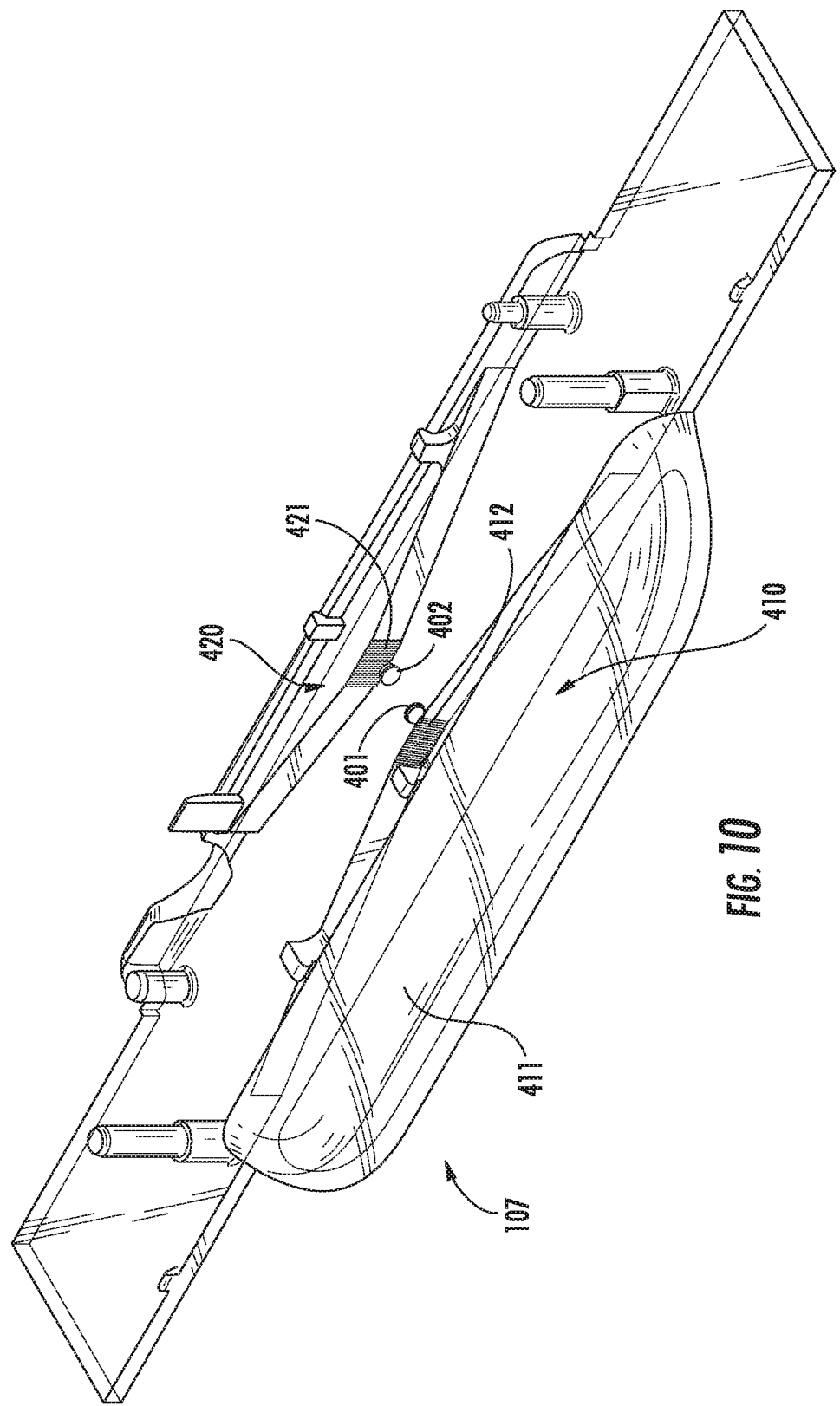
FIG. 10 is a view of a lighting mechanism that may be used with the hinge assembly of FIG. 9 according to an example embodiment.

Referring to FIGS. 8-10, alternative example embodiments of lighting mechanism 107 are shown. As shown in FIGS. 8-10, lens 410 or lens portion 411 may be shaped differently than in the example embodiments shown in FIGS. 2-4, to "bend" or otherwise direct light from light source 401 toward a toilet bowl, such as toilet bowl 110. In FIGS. 8-10, lens portion 411 is wider than in the embodiments shown in FIGS. 2-4 to provide a different distribution of light 109 from light source 401 into the bowl 110. In other embodiments, other shapes for lens 410 or for lens portion 411 may be used.

Figure 7:
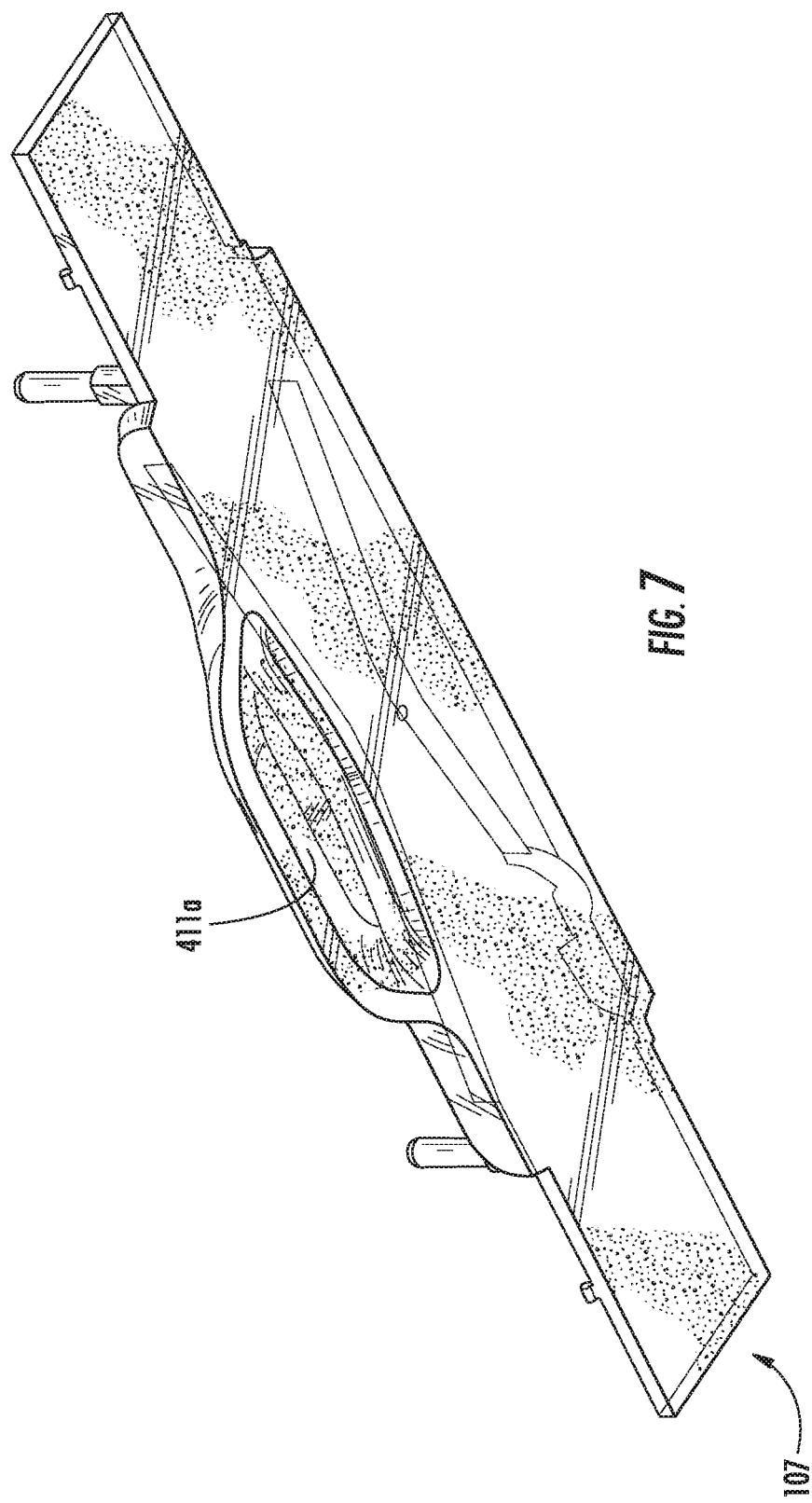
FIG. 7 is a view of a lighting mechanism that may be used with the hinge assembly of FIG. 3 according to an example embodiment, from an angle under the lighting mechanism.
Figure 11:
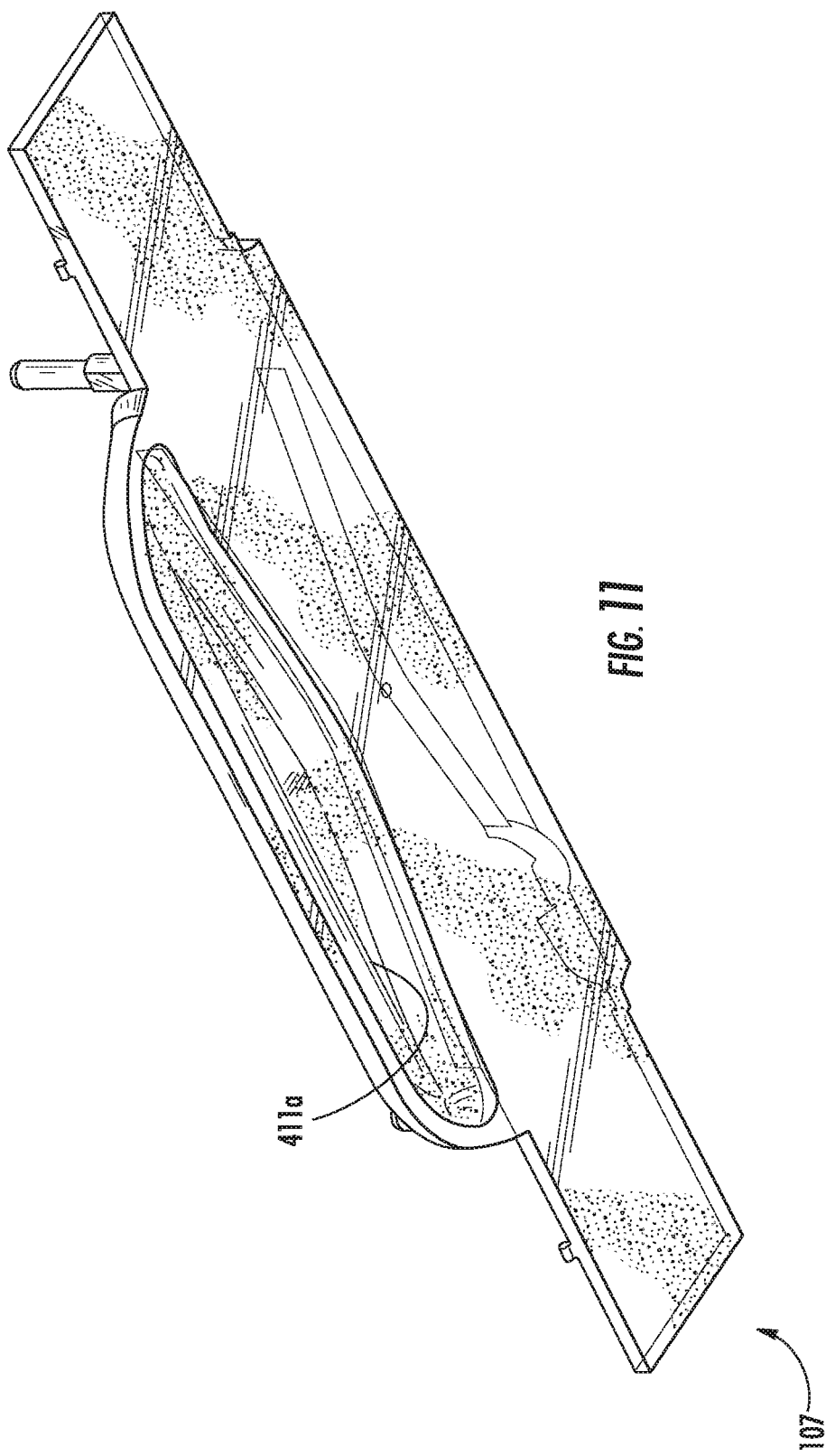
FIG. 11 is a view of a lighting mechanism that may be used with the hinge assembly of FIG. 9 according to an example embodiment, from an angle under the lighting mechanism.

Referring to FIG. 7 and FIG. 11, example embodiments of lighting mechanism 107 are shown from an angle under lighting mechanism 107. In certain embodiments, as shown in FIGS. 7 and 11, at least a portion of lower surface 411a of curved portion 411 (shaped differently in FIG. 7 and FIG. 11), or the entire lower surface 411a of curved portion 411, may be textured. This texture, for example, is intended to diffuse light 109 from light source 401. In certain embodiments, as shown in FIGS. 7 and 11, additional portions of a lower surface of lighting mechanism 107, or an entire lower surface of lighting mechanism 107, may be textured. In certain embodiments, lower surface 411a or lower surface of lighting mechanism 107 may not be textured.

Figure 12:
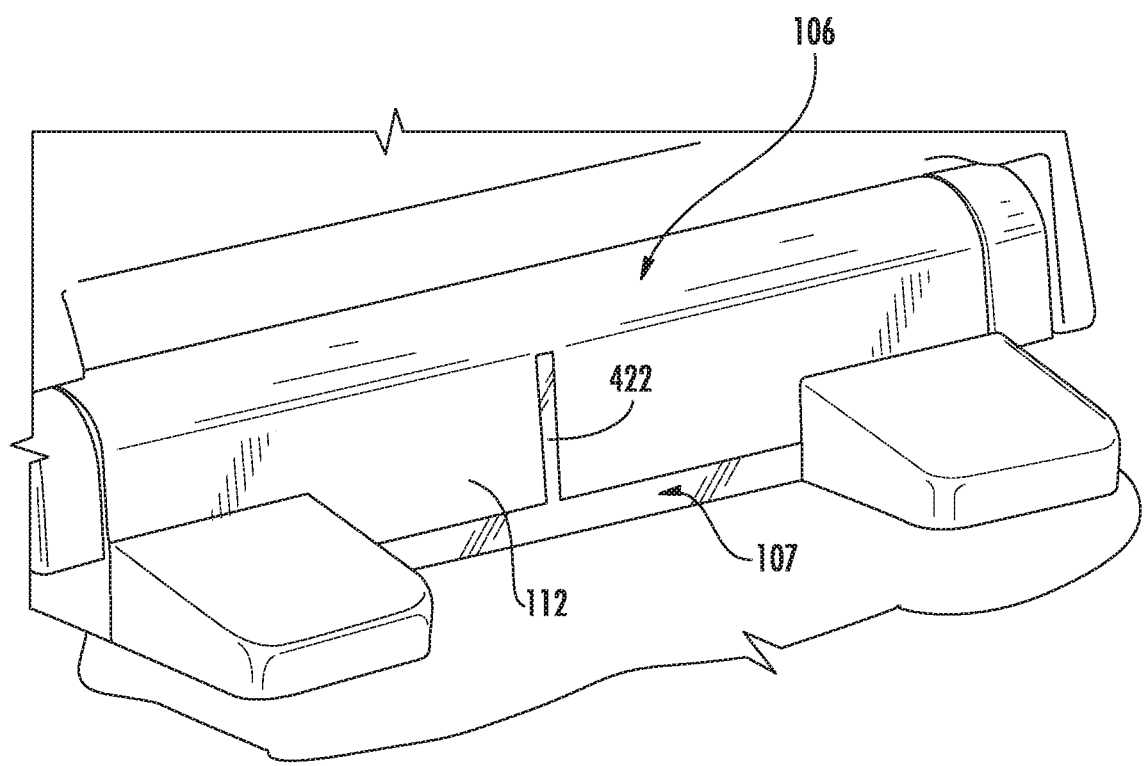
FIG. 12 is a view of a hinge assembly that may be used according to an example embodiment.
Figure 13:
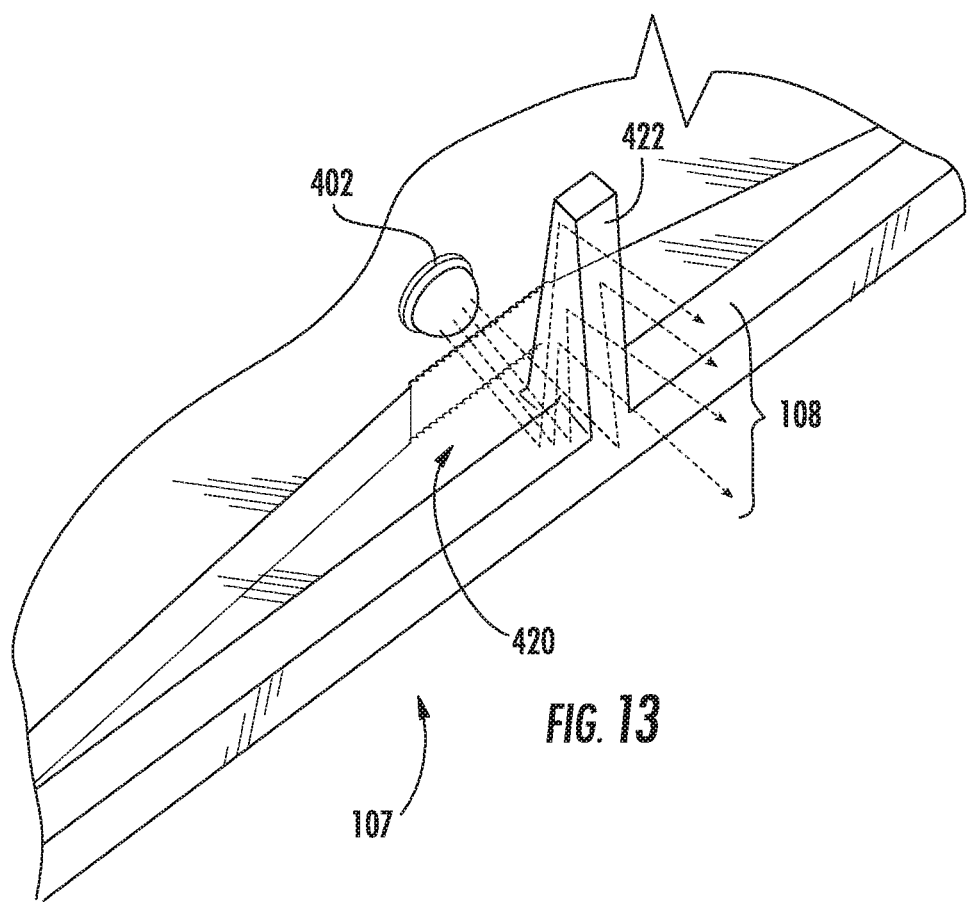
FIG. 13 is a view of a lighting mechanism that may be used with the hinge assembly of FIG. 12 according to an example embodiment.

Referring to FIG. 12 and FIG. 13, alternative example embodiments of hinge assembly 106 and lighting mechanism 107 are shown. As shown in FIG. 12 and FIG. 13, lens 420, and in certain embodiments hinge housing 112, may be shaped differently than as shown in the earlier figures, to "bend" or otherwise direct light 108 from light source 402 toward a toilet tank, such as toilet tank 102. In FIG. 12 and FIG. 13, lens 420 includes a vertical light guide 422, and hinge housing 112 has an opening to accommodate vertical light guide 422. As shown in FIG. 13, vertical light guide 422 is configured to direct light 108 from the light source 402 in an upward direction, and outward toward a toilet tank, such as toilet tank 102. In other embodiments, other shapes for lens 420 may be used.

The term "or" in the description and claims refers to inclusive or, such that, for example, "A or B" means A, B, or A and B, and for example, "A, B, or C" means A, B, C, or any combination thereof (e.g., A and B, A and C, B and C). It should be further understood that the term "a" and "an" are not limited to a single instance and should be generally understood as "one or more," such that, for example, "a material" refers to one or more materials.

The terms "approximately," "about," "substantially" and "similar" are used in the broad sense in line with their usage commonly allowed by those skilled in the art familiar with the field of this description. One skilled in the art will understand upon reading this description and claims that these terms are used to allow a description of certain described and claimed features without restricting the scope of those features to precise numerical values. Consequently, these terms should be interpreted as indicating that modifications or developments of the embodiments described and claimed are included in the scope of the invention as defined in the claims. As an example, "approximately perpendicular" includes perpendicular, as well as variations in line with the usage of "approximately" commonly allowed by those skilled in the art familiar with the field of this description, "approximately perpendicular" does not restrict the scope of said feature to a precise position, and modifications or developments thereof are included in the scope of the term.

The terms "example" and "exemplary" are used to describe several embodiments and indicate that those embodiments are possible examples, depictions or illustrations of different embodiments (these terms are not used to indicate that certain embodiments are better than other embodiments, extraordinary or high-quality examples).

The terms "couple," "connect" and similar terms refer to the junction of two elements to each other directly or indirectly. This junction may be fixed (i.e., permanent) or movable (i.e., removable or detachable). This junction may be done with two elements where the two elements and any additional intermediate element are fully formed as a single unitary body, or with two elements where the two elements and any additional intermediate element are fastened to each other.

The references used regarding the position of the elements (for example, "upper," "lower," "above," "below," etc.) are simply used to describe the orientation of the various elements in the figures. The orientation of these various elements may vary as a function of different embodiments, and the variation is included in the scope of the description and claims.

The construction, shape and arrangement of the different embodiments are purely illustrative. Although only some embodiments have been described in detail in the description, one skilled in the art will easily see, upon reading the description, the possible modifications (for example, variation of the shapes, sizes, dimensions, structures, and proportions of the different elements, parameter values, assembly types, use of material, colors, orientations, etc.) that can be made without going beyond the scope of the description and claims. For example, the shape of a component or part may be modified to achieve a similar result, the elements illustrated having a single body may be built from multiple parts or elements, the functionality of two parts may be achieved by one part, the position of the elements may be reversed or modified, and the nature and number of elementary elements or positions may be modified or altered. Other substitutions, modifications, changes and deletions may also be made to the operating conditions and the arrangement of the different embodiments without going beyond the scope of the description and claims.

What is claimed is:

1. A toilet assembly, comprising:
   a toilet base including a bowl;
   a hinge assembly comprising:
      a housing configured to be secured to the toilet base;
      a lens comprising a base, which is enclosed within the housing, and a curved portion, which extends forward from the base beyond the housing, wherein the curved portion includes an arcuate upper surface and an arcuate lower surface; and
      a light source enclosed within the housing and configured to emit light toward an inlet of the base of the lens such that the curved portion directs the light from the light source downwardly toward the bowl; and
   a toilet seat pivotally coupled to the hinge assembly, such that the toilet seat rotates relative to the housing and the lens,
   wherein the curved portion includes a flat distal end surface that is configured to direct light passing through the curved portion downwardly into the bowl, and
   wherein the curved portion extends beyond a rim of the bowl, and the distal end surface overhangs an opening defining the bowl.

2. The toilet assembly of claim 1, wherein at least a portion of the curved portion is textured.

3. The toilet assembly of claim 1, wherein the inlet of the base is rippled, and the light source is positioned to emit light directly into the rippled inlet.

4. The toilet assembly of claim 3, wherein the rippled inlet includes a plurality of curved surfaces, and the light source points in a direction approximately perpendicular to the rippled inlet.

5. The toilet assembly of claim 3, wherein the rippled inlet includes a plurality of angled surfaces, and the light source points in a direction approximately perpendicular to the rippled inlet.

6. The toilet assembly of claim 1, wherein the light source is a first light source, and the toilet assembly further includes a second light source configured to emit light in an opposite direction as the first light source.

7. The toilet assembly of claim 6, wherein the inlet of the base of the lens is a first inlet, and the base includes a second inlet located opposing the first inlet.

8. The toilet assembly of claim 7, wherein the lens is a unitary body, the base includes a bottom wall that is configured to mount to the toilet base, and each of the first and second inlets extends from and transverse to a top side of the bottom wall.

9. A toilet seat assembly, comprising:
   a base comprising:
      a bottom wall configured to mount to a toilet base;
      a first lens extending away from a first part of the bottom wall, the first lens having an inlet and a curved portion extending away from the inlet and beyond the first end;
      a second lens extending away from a second part of the bottom wall, the second lens having an inlet that opposes the inlet of the first lens;
   a first light source coupled to the base and configured to emit light directly into the inlet of the first lens, wherein the light from the first light source is redirected from a first direction to a second direction by the curved portion;
   a second light source coupled to the base and configured to emit light directly into the inlet of the second lens;
   a housing coupled to the base and enclosing the first and second light sources between the housing and the base; and
   a toilet seat pivotally coupled to the housing,
   wherein the curved portion acts as a light guide to direct a first portion of the light from the first light source downwardly toward a first part of a bowl, and
   wherein the curved portion includes a concave surface that is configured to reflect a second portion of the light from the first light source, which passes outside of the curved portion, downwardly toward a second part of the bowl.

10. The toilet seat assembly of claim 9, wherein the first and second light sources are disposed adjacent to one another facing in opposite directions.

11. The toilet seat assembly of claim 10, wherein the inlets of the first and second lenses are substantially parallel, and the first and second light sources are located between the inlets and above the bottom wall.

12. A toilet seat assembly, comprising:
a base comprising:
a bottom wall configured to mount to a toilet base;
a first lens extending away from a first part of the bottom wall, the first lens having an inlet and a curved portion extending away from the inlet and beyond the first end; and
a second lens extending away from a second part of the bottom wall, the second lens having an inlet that opposes the inlet of the first lens;
a first light source coupled to the base and configured to emit light directly into the inlet of the first lens, wherein the light from the first light source is redirected from a first direction to a second direction by the curved portion;
a second light source coupled to the base and configured to emit light directly into the inlet of the second lens;
a housing coupled to the base and enclosing the first and second light sources between the housing and the base; and
a toilet seat pivotally coupled to the housing,
wherein the first and second light sources are disposed adjacent to one another facing in opposite directions,
wherein the inlets of the first and second lenses are substantially parallel, and the first and second light sources are located between the inlets and above the bottom wall, and
wherein the curved portion acts as a light guide to direct a first portion of the light from the first light source downwardly toward a first part of a bowl, and the curved portion includes a concave surface that is configured to reflect a second portion of the light from the first light source, which passes outside of the curved portion, downwardly toward a second part of the bowl.

13. The toilet seat assembly of claim 12, wherein the concave surface is a lower surface of the curved portion, and the curved portion includes a convex upper surface.

14. The toilet seat assembly of claim 13, wherein the curved portion includes a flat distal end surface that extends between an end of the concave lower surface and an end of the convex upper surface.

15. The toilet seat assembly of claim 9, wherein the inlet of each of the first and second lenses is rippled to disperse the light from the associated light source as the light enters the lens.

16. The toilet seat assembly of claim 15, wherein each rippled inlet includes a plurality of curved surfaces.

17. The toilet seat assembly of claim 16, wherein the base is a unitary element, such that the bottom wall, the first lens, and the second lens are made of the same material.

* * * * *